US005617568A

United States Patent [19]
Ault et al.

[11] Patent Number: 5,617,568
[45] Date of Patent: Apr. 1, 1997

[54] SYSTEM AND METHOD FOR SUPPORTING FILE ATTRIBUTES ON A DISTRIBUTED FILE SYSTEM WITHOUT NATIVE SUPPORT THEREFOR

[75] Inventors: Michael B. Ault, Austin; Ernst R. Plassmann, Pflugerville; Bruce A. Rich, Round Rock; Michael D. Wilkes, Austin, all of Tex.

[73] Assignee: International Business Machines Corporation, Armonk, N.Y.

[21] Appl. No.: 355,868

[22] Filed: Dec. 14, 1994

[51] Int. Cl.$^6$ .................................................. G06F 17/30
[52] U.S. Cl. ........................................ 395/612; 395/712
[58] Field of Search ............................ 395/600, 700, 395/612, 712; 364/DIG. 1, DIG. 2

[56] References Cited

U.S. PATENT DOCUMENTS

| | | | |
|---|---|---|---|
| 4,644,468 | 2/1987 | Doster et al. | 395/200.02 |
| 4,816,826 | 3/1989 | Munter et al. | 340/825.52 |
| 4,916,608 | 4/1990 | Shultz | 395/650 |
| 4,982,324 | 1/1991 | McConaughy et al. | 395/200.09 |
| 4,999,766 | 3/1991 | Peters et al. | 395/600 |
| 5,113,519 | 5/1992 | Johnson et al. | 395/600 |
| 5,218,696 | 6/1993 | Baird et al. | 395/600 |
| 5,257,369 | 10/1993 | Skeen et al. | 395/650 |
| 5,317,722 | 5/1994 | Evans | 395/500 |
| 5,317,728 | 5/1994 | Tevis et al. | 395/600 |
| 5,321,816 | 6/1994 | Rogan et al. | 395/200.01 |
| 5,333,317 | 7/1994 | Dann | 395/600 |
| 5,339,435 | 8/1994 | Lubkin et al. | 395/700 |
| 5,371,885 | 12/1994 | Letwin | 395/600 |
| 5,408,619 | 4/1995 | Oran | 395/325 |
| 5,412,808 | 5/1995 | Bauer | 395/600 |
| 5,421,012 | 5/1995 | Khoyi et al. | 395/650 |
| 5,434,974 | 7/1995 | Loucks et al. | 395/700 |
| 5,497,463 | 3/1996 | Stein et al. | 395/200.03 |
| 5,499,358 | 3/1996 | Nevarez | 395/600 |

OTHER PUBLICATIONS

"OSF's Distributed Computing Environment", R. Kumar, Aixpert, IBM Corporation, fall, 1991, pp. 22–29.
"An Overview of the OSF DCE Distributed File System", G. Lebovitz, Aixpert, IBM, Feb. 1992, pp. 55–64.
"The Distributed File System (DFS) for AIX/6000", IBM, Doc. No. GG24–4255–00, May 1994, pp. 1–15.
"Understanding, DCE", W. Rosenberry et al, O'Reilly & Associates, Inc. Publishers, Sep. 1992, pp. 6–100.

*Primary Examiner*—Thomas G. Black
*Assistant Examiner*—Maria N. Von Buhr
*Attorney, Agent, or Firm*—Robert M. Carwell

[57] ABSTRACT

A system and method to provide native support in a distributed computing environment distributed file system for an operating system's extended file attributes. Such attributes remain invisible in the namespace which the operating system's distributed file system clients may access. A directory of the form .*_ for a file in DFS namespace is created for which extended attributes (EA) are required, with a subdirectory thereunder whose name is that of the file. Extended attributes are filed under this .*_ directory having filenames of the attributes' names. Provision is made for discriminating EAs and for efficiently accessing total EA size and number of critical EAs, by cumulating and storing them in an additional file under the subdirectory.

18 Claims, 9 Drawing Sheets

PRIOR ART

SYSTEM AND METHOD FOR SUPPORTING FILE ATTRIBUTES ON A DISTRIBUTED FILE SYSTEM WITHOUT NATIVE SUPPORT THEREFOR

CROSS-REFERENCE TO RELATED APPLICATIONS

The present application is related to copending U.S. patent application 08/572,582 entitled "SYSTEM AND METHOD FOR PROVIDING COMPATABILITY BETWEEN DISTRIBUTED FILE SYSTEM NAMESPACES AND OPERATING SYSTEM PATH-NAME SYNTAX", filed on Dec. 15, 1994, pending, and incorporated herein by reference.

TECHNICAL FIELD

This invention relates to operating systems and related file systems for use in computer environments and, more particularly, to file systems for distributed attribute support.

BACKGROUND OF THE INVENTION

Most end-user applications consist of three basic components: a user interface, computational function, and information storage. In the early evolution of computer systems, the general computing model for non-distributed applications was most frequently employed wherein these components were typically integrated in one system so as to be indistinguishable.

As the art developed, it became evident that numerous benefits could be obtained from distributed computing models wherein applications might be distributed across computer systems, the simplest approach being to break the application down into the hereinbefore noted components. It became apparent that a user interface, for example, might be remote from the computational function, and, in like manner, information storage might be remote, as in a distributed file system, and that even the routines which process the information in the files could be remote from the functions which manage the physical storage media. It was further realized as the art developed, that it may be desirable to even distribute portions of a component itself among multiple machines, the foregoing being aspects of what is known as distributed computing models.

Thus, high-powered individual computers and connectivity solutions (such as LANS and WANS) are now dramatically changing the way computers process information. The previously described isolated, dedicated, early single-user systems are no longer the norm. Today, users expect to reach beyond their desktop computers to exploit greater features, functionality, and performance. Distributed computing solutions have existed since the mid-1980's as, for example, in the Open Network Computing (ONC) and Network Computing System (NCS) systems from Sun Microsystems and Hewlett-Packard, respectively. Despite their availability distributed applications were a relatively scarce commodity because of difficulty in programming, with existing tools only being piecemeal solutions.

The distributed computing revolution challenged the computer industry to provide interoperability among components in heterogeneous, networked environments. Interoperability required more than mere connectivity to a network in order to allow applications to exploit the potential resources in the networked environment and to provide dramatically improved performance. Developers, in exploiting this environment, required a complete set of tools within an architectural framework to ease development. As a result, a distributed computing environment arose to meet these needs in the form of a comprehensive integrated set of services known as the Distributed Computing Environment (DCE) by the Open Systems Foundation, which work across multiple systems remaining independent of any single system.

Numerous characteristics serve to define the DCE model. Among these are that DCE services are protected from a single point of failure by copying the services and important files to additional hosts in the network. Though many interdependencies exist among DCE components, the centralized control allows management of each component independently from the others whereby independently manageable sub-environments called cells are provided. Such decentralization minimizes bottlenecks whereby workloads are distributed among multiple hosts. The DCE system further provides flexibility in the decentralization permitting changing, adding, or reconfiguring hardware and software without impacting the surrounding environment. Although closely integrated, DCE's modular structure permits tailoring DCE configurations by installing DCE servers on computers with appropriate resources. DCE further harnesses latent computing power sitting idle in machines on the network by means of remote procedure calls (RPC) and DCE threads. Moreover, by the aforementioned technique of locating critical application servers on multiple hosts and replicating important files onto other systems, critical work may be kept in process while some systems fail, thereby providing increased availability.

Still further benefits to the DCE environment addressed limitations on local data storage by providing a distributed file service (DFS) which provides a single view of all files in an organization both to UNIX and non-UNIX systems to all users. This important DFS aspect of DCE will be hereinafter described in greater detail. The DCE environment further provides, by means of such DFS, a database storing the location of all files in the file service. When files move, the DFS automatically updates the database of the new location. Similarly, distributed application clients may use the DCE directory service to locate associated servers, thereby providing services which track data and programs. Moreover, the aforementioned DCE RPC hides differences in data requirements by converting data to appropriate forms needed by clients and servers, thereby accommodating heterogeneous data. These and other benefits to the DCE systems and, in particular the OSF implementation, gave rise to an increased interest in adoption of such systems with a concomitant need for further developments of the components thereof, such as the aforementioned DFS to be described in greater detail. Further background on distributed computing and DCE systems may be found in "Understanding DCE", Rosenberry, Kenney, and Fisher, by O'Reilly and Associates, Inc., Publishers, copyright 1992 and "OSF's Distributed Computing Environment", by Ram Kumar, AIXpert, copyright IBM Corporation, fall, 1991.

Figure 2:
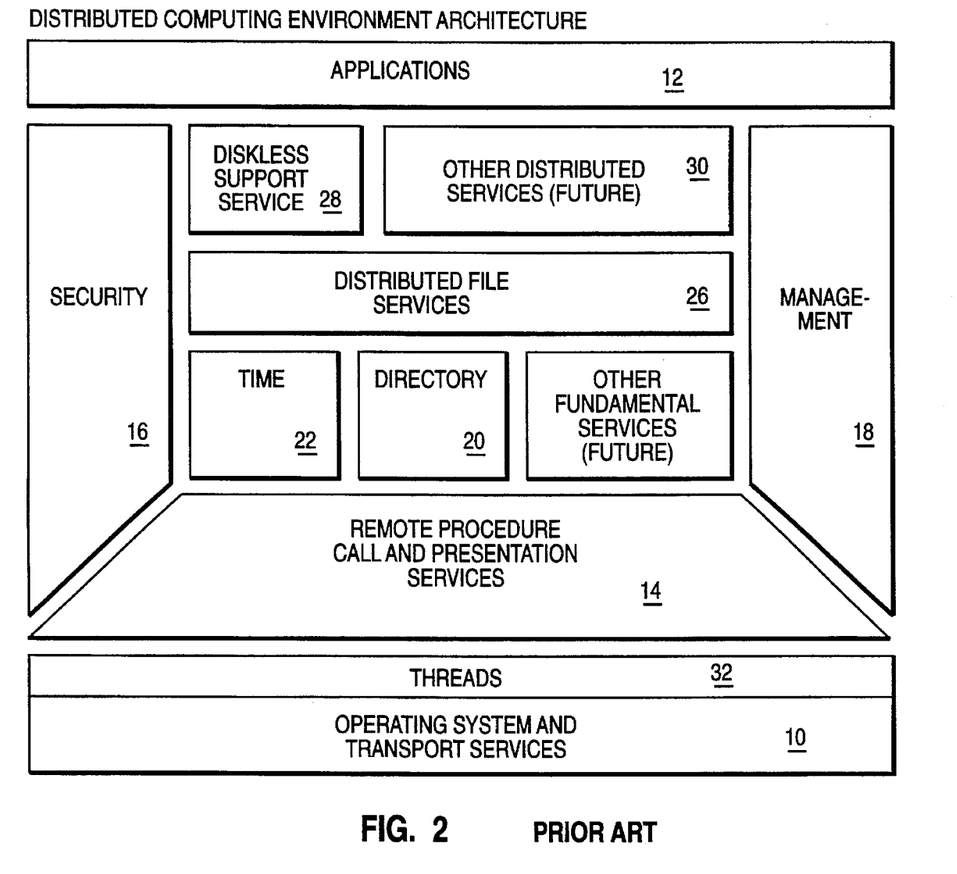
FIG. 2 is a conceptual block diagram of the DCE computing environment architecture.

An overall high level view of the DCE architecture may be seen with reference to FIG. 2. It is layered between the operating system 10 and applications 12. Within DCE, three infrastructure components permeate all other components, namely the aforementioned remote procedure call (RPC) and presentation services 14 (which allow developers to program for a distributed environment as easily as a stand-alone system): security service, 16 (ensuring against unauthorized access), and management services 18 (providing utilities to manage DCE services).

Additional components of DCE depicted in FIG. 2 are as follows. A directory service 20 provides a way for users to name and locate objects, and is centrally positioned as a keystone of the architecture. It gives distributed system users a well known, central repository in which to store information which may be retrieved from anywhere in the distributed system. A time service 22 provides a consistent view of time in the distributed environment. Other fundamental services, 24, act as a place holder for future services. The distributed file services (DFS) to be hereinafter described further, 26, provides a consistent unified view of all files in the distributed system. A diskless support service, 28, extends DCE to low-cost, diskless nodes. Other distributed services 30, will provide services likely to be offered in the future including spooling services, transaction services, and object-oriented environments.

To build distributed applications, developers need an easy-to-use programming model, such as the remote procedure call (RPC) 14, to take advantage of the distributed computing architectures. RPC allows developers to partition various tasks required by an application into separate procedure modules which may be executed on different systems. This offers benefits of an easy-to-use programming model, balanced, distributed use of computing resources, and the ability to run applications across diverse software and hardware platforms as previously described.

Still referring to FIG. 2, threads 32 allow multiple sequential flows of execution within a single process. Such threads provide a simple concurrency paradigm maintaining a synchronous model inside each thread while ensuring that synchronous events take place. In a client-server environment they allow servers to handle multiple clients simultaneously, and further allow clients to make multiple requests simultaneously, thereby providing better service availability. More detail regarding the RPC model 14 and its interaction with directory services 20 may be obtained in the aforementioned reference by Kumar.

Figure 3:
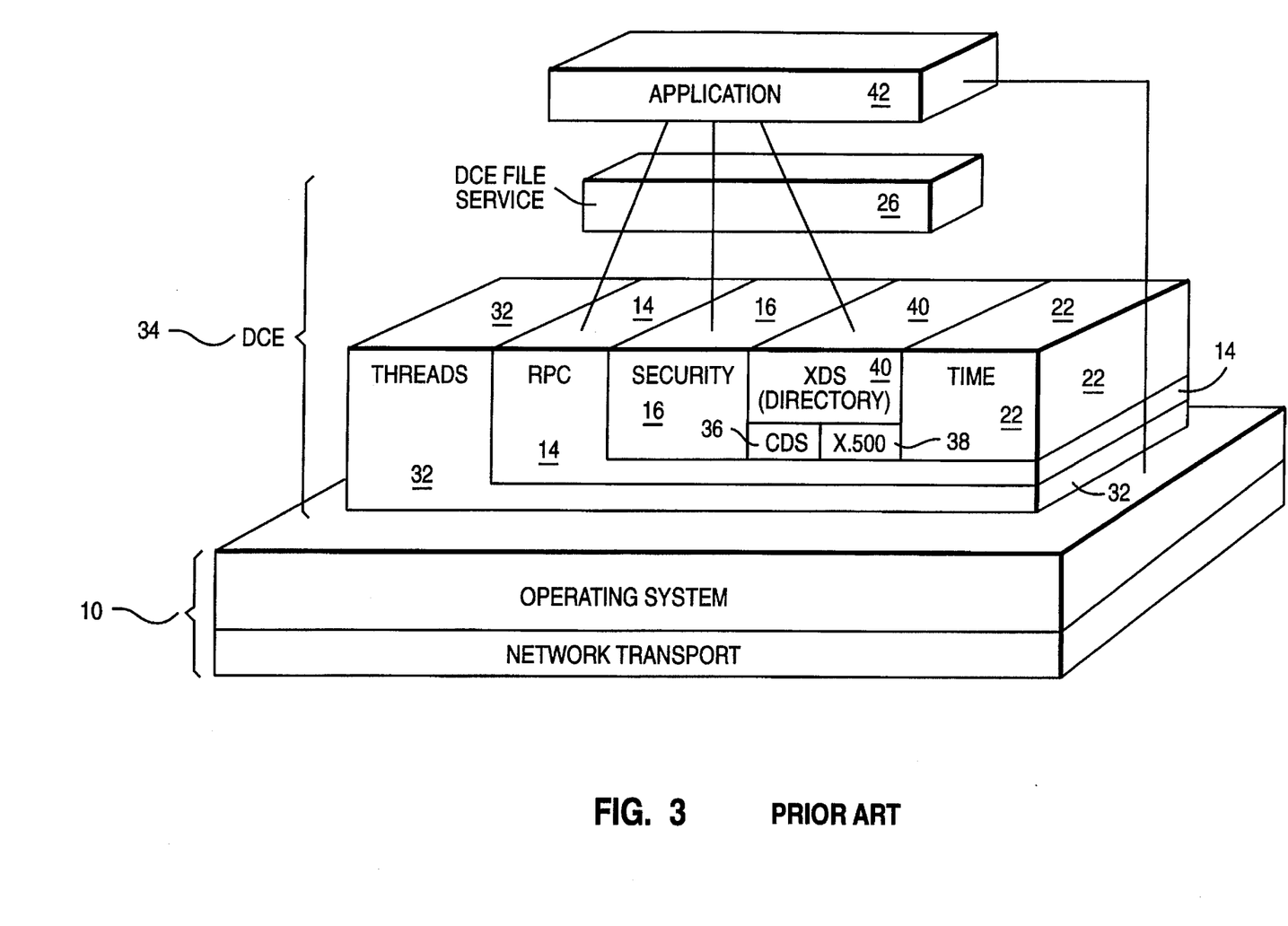
FIG. 3 is another illustration of the DCE architecture of FIG. 2 depicting the layered aspect thereof.

It will be recalled that the DCE is thus a layer of software which masks differences between various kinds of hosts. Referring to FIG. 3, this layering may perhaps be more readily comprehended than in FIG. 2. The DCE 34 layer will be seen as sitting on top of the host operating system and networking services 10, and offers its services to applications 42 thereabove. From the conceptual model of DCE in FIG. 3, the relationship may be seen between the DCE distributed services (security 16, directory 40, and time 22 to RPC 14 and thread services 32). RPC and threads are base DCE services available on systems on which DCE is installed. From the layered appearance of FIG. 3, it will be more readily appreciated how similar to applications employing underlying DCE services for distribution the DCE file service 26 is. It will also be appreciated that the directory 40 actually includes a cell directory service (CDS) component 36 and X.500 directory service 38 (GDS) which programs utilize by calling the X.500 directory service (XDS) application programming interface 40.

Continuing with FIG. 3, it further illustrates how an application 42 may utilize DCE APIs. A distributed application does not require use of all DCE APIs but rather only utilizes those which it requires. Thus, in the illustration of FIG. 3, the application 42 might only require the RPC 14, security 16, XDS 40, and operating system APIs.

One important aspect of DCE relating directly to the present invention is the distributed file system (DFS) which will be described now in greater detail. An overview of DFS may be obtained in "An Overview of the OSF Distributed File System" by Lebovitz, AIXpert, February, 1992, copyright IBM and in the previous cite to the article by Kumar, incorporated herein by reference.

A distributed file system is an application allowing a user on one computer to easily access files on another. To the user, the distributed file system appears as a large, local file system.

Such distributed file systems have been in use for at least 20 years, with early development occurring at the Palo Alto Research Center (PARC) of the Xerox Corporation, wherein distributed file systems for LANs were experimented with in the early 1970's.

Most distributed file systems are similar to the original Xerox system. Files stored on a workstation disk are local files, and those stored on the central file system are referred to as remote files. When a workstation user tries to access a remote file, a message requesting information is sent through the network to the central file system. When the central file system receives the message, it obtains the requested information from its disk drive and sends it back to the workstation in another message. A user modifies a remote file in a similar way. Modified information is sent to the central file system in a network message. When the file system receives the message, it writes the modified information to its local disk.

A major drawback of such distributed file systems is the amount of resources they utilize. They require more network and remote file system resources than local sources, creating two problems. First, performance on the local computer is only as good as the performance of the central file system, e.g. increasing the power of the desktop computer does not necessarily increase overall system performance. Secondly, such a system cannot grow gracefully to an enterprise-wide system.

There are numerous more modern remote file systems presently in use which include the network file system (NFS) from Sun Microsystems, various distributed PC network file systems, notably from Apple, Banyan, Microsoft, and Novell, and various vendor-specific systems such as DECnet from Digital Equipment Corporation and Domain from Hewlett-Packard Corporation.

The evolution of computer technology has vastly increased the power of individual workstations and PCs. However, computers have evolved more quickly than distributed file systems which do not fully exploit the wealth of resources available. Several drawbacks accordingly are present in modern distributed file systems. These include lack of consistent and uniform file naming space, inconvenient multiple security systems in need of an integrated approach, data inconsistencies, lack of performance and scalability, weaknesses in system management and administration, incompatibility with file system standards, and lack of support for wide area networks.

Figure 4:
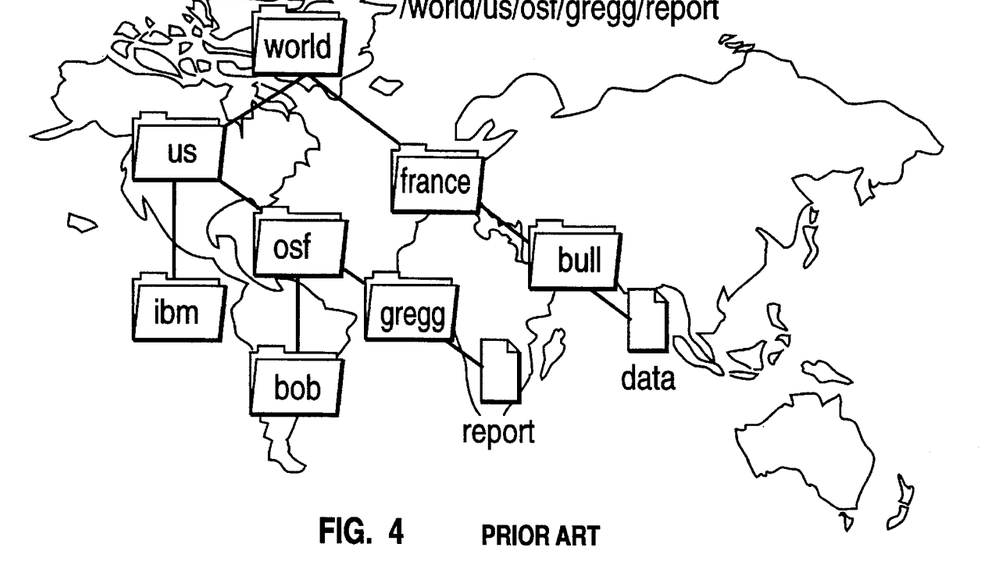
FIG. 4 is an illustration of the global nature of the DCE file system.

As part of the hereinbefore described OSF's DCE, the distributed file system (DFS) component thereof took a new approach to building an enterprise-wide distributed file system. It employs modern high performance workstations and PCs, and exploits performance-enhancing techniques like caching and replication, thereby distinguishing DFS from earlier file systems. As but one example, by integrating a distributed file service 26 with the DCE directory services 20, DFS thereby allowed users to access files in a consistent manner from different workstations in a distributed computing environment. These directory services thereby ensured that the system utilized a uniform naming convention for all files stored in DFS. As previously noted, DCE directory services are based upon industry standards, ensuring that every computer resource in the world may be identified and accessed with a unique and consistent name —such resources including computers, application services, and files. Referring to FIG. 4, there is depicted an illustration of how a file located somewhere in a worldwide DCE file system may readily be located using the aforementioned global directly service (GDS).

Continuing with the background description of DFS, further information regarding DFS may be obtained from "The Distributed File System (DFS) for AIX/6000", document #GG24-4255-00, IBM Corporation, copyright May, 1994. As previously noted, DFS technology provides the ability to access and store data at remote sites similar to the technique used with NFS. It extends the view of a local, and therefore limited in size file system to the distributed file system of almost unlimited size located on several remote systems. Several advantages touched on previously are thereby provided over a centralized system including providing access to files from anywhere in the world (FIG. 4), higher availability through replication, and providing users on systems the ability to access data from a nearly unlimited data space. As such DFS is considered an essential part of DCE, and was basically an enhanced version of the Andrew File System (AFS) technology marketed by the Transarc Corporation and recently integrated into the base DCE technology.

Figure 5:
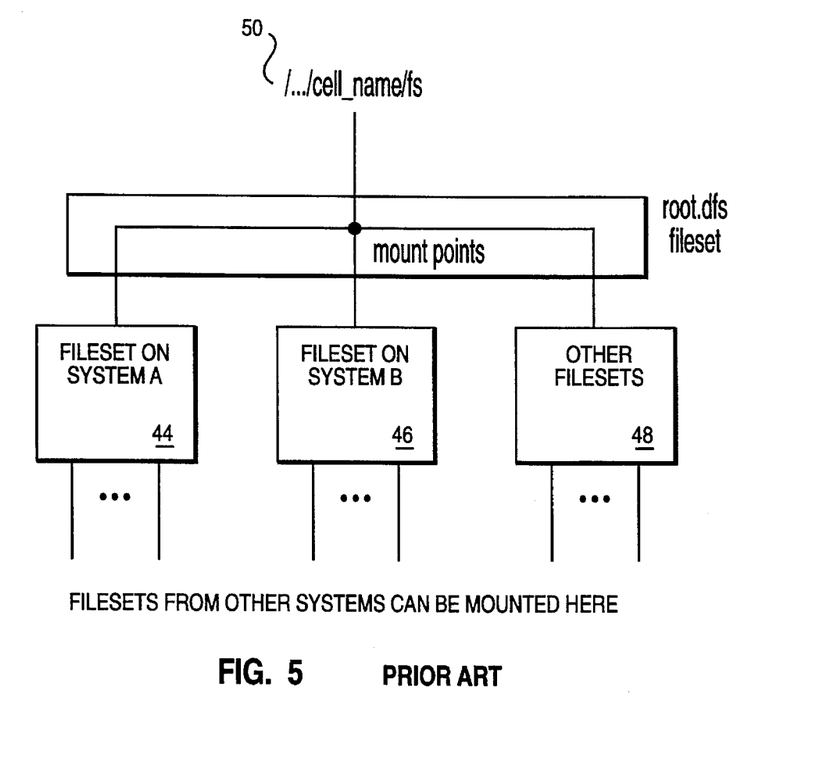
FIG. 5 is a block diagram illustrating a single image view of the DFS namespace.

Turning to FIG. 5, the distributed file system from DCE DFS is a collection of several file systems illustrated at 44-48 located on distributed systems. All such file systems are mounted into a single virtual file system space with a single namespace. The end-user thereby has direct access to all files in this distributed file system without knowing where the physical files reside. Still referring to FIG. 5, it will further be noted that a hierarchical structure is provided consisting of directories and files as is known from other Unix systems. The root of the DFS file structure is a junction 50 in the DCE naming space, and the multiple file sets 44-48 may reside on different servers and may be mounted into the DFS namespace.

Figure 6:
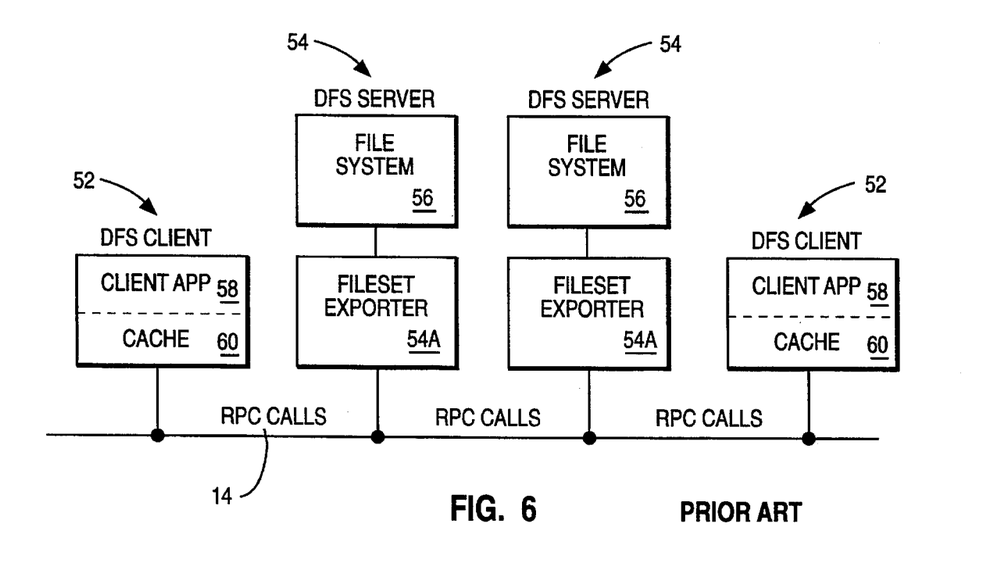
FIG. 6 is a block diagram of a DFS client and server file server operation.

Concerning overall DFS operation, DFS is built upon the concept of a client-server architecture. Turning to FIG. 6, a plurality of clients 52 and servers 54 are shown. The server provides data and the client uses the data. Communication between the server and client is handled with the previously described DCE remote procedure calls (RPC) 14. Systems in a DFS environment which own file systems export them and users on other systems access such file systems. Such file exporting machines are called DFS file server systems (e.g. DFS servers 54) and the importing machines are called DFS client systems (DFS clients 52). A machine can be both a server and client. FIG. 6 further shows the client/server nature of DFS.

Each DFS server system runs a corresponding file set exporter 54A which makes file systems 56 available to the DFS file space. DCE cells may have one or more DFS file servers, with two being shown in FIG. 6. As noted previously, a system may function as both a DFS client and DFS server. Each DFS client runs one or more client applications 58 which in turn may access cache on its respective client.

Figure 7:
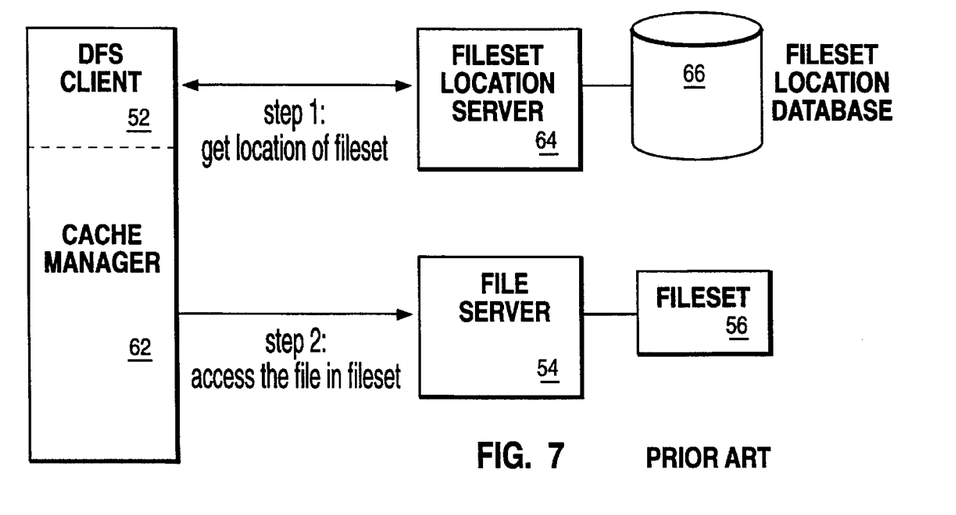
FIG. 7 is a block diagram illustrating how a DFS client locates a DFS server.

Turning now to FIG. 7, DFS clients run the cache manager 62, which caches data from the file exporter 54A in memory or on a local disk, such cache manager providing the important function of improving performance and availability. DFS server systems desiring to export file sets must register their export file sets at a system known as the file set location server 64. The file set location server maintains a database 66 of all file sets. This database is utilized to keep track of the physical locations where file sets are stored. If a DFS client 52 requires access to one of the file sets, it sends a request first to the file set location server/database 64, 66 to inquire about the physical location of the file set, After receiving location information, the client 52 then contacts the actual particular DFS file server 54 wherein the particular file set or file system 56 resides.

In addition to the previously discussed DFS machine roles providing the basic function of DFS file server machines, DFS client machines, and file set location servers, there are other functions or services which may be provided by one or more machines well known in the art. These services may be categorized into machine roles, not all of which are required. Moreover, a machine may actually serve more than one role, although more likely they will be spread out throughout a cell. Such machines known in the art include file server machines, private file server machines, file set location servers, DFS clients, system control machines, binary distribution machines, backup database machines, and tape coordinator machines, all of which are described in further detail in the aforementioned DFS for AIX/6000 publication.

Numerous basic benefits are provided by DCE DFS over other types of distributed file systems. These include providing a uniform file space, caching on the DFS client machine, finer granularity for access control, ability to establish binary distribution machines, ability to work on other vendor platforms, built-in backup capability, and diverse administration options.

As to the DFS relation to DCE, DFS is built on top of the underlying DCE services as previously described, taking advantage of the lower level services of DCE such as RPC, security services, directory and time services. Before DFS may be configured on a machine, it requires the following DCE components be installed, configured, and running in the cell: security server, director server, and DCE time servers, all of which are also further described in detail in the aforementioned AIX article.

Figure 8:
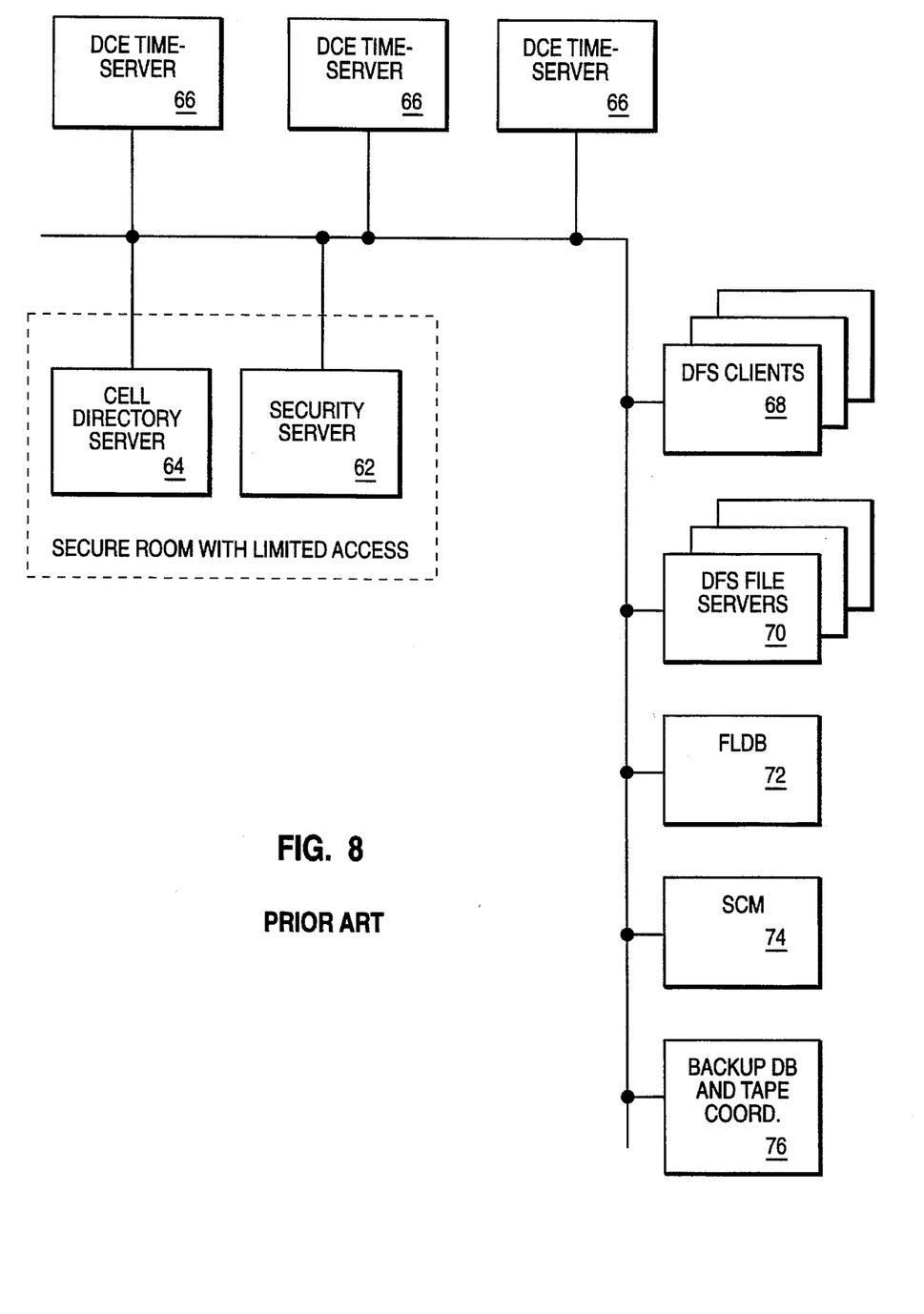
FIG. 8 is a block diagram illustrating a fully configured DCE DFS cell.

Referring now to FIG. 8, it first illustrates the required DCE components previously mentioned for running in a cell before DFS may be configured on a machine, namely the security server 62, cell directory server 64, and DCE time servers 66. The further purpose of FIG. 8 is to not only show the aforementioned components for a DCE configuration, but additionally the DFS components which have been added to implement a DCE DFS cell, thereby also illustrating the different DFS machine roles. As previously described, DCE cell requirements are for at least one cell directory server 64, one security server 62 and at least three DCE distributed time servers 66. However, these are DCE requirements for a cell and not DFS requirements. The DCE cell may operate with the above requirements. However, in order to add the DFS capability to the DCE cell, the following additional components are required. First, all DFS clients 68 and servers such as DFS file servers 70 must be minimally configured as DCE clients. Secondly, at least one file set location database machine 72 is required and at least one system control machine 74 per administrative domain. A backup database machine and tape coordinator 76 are optional. Further details regarding these additional components to implement DFS on DCE may also be found in the aforesaid AIX publications.

With the foregoing background in mind regarding a DCE DFS cell implementation, the problem addressed by the subject invention may now be further understood. It is at times desirable to operate differing operating systems in a DCE environment such as the OS/2 (Trademark of the IBM Corporation) operating system provided by the IBM Corporation. Such file systems typically (and specifically in the case of OS/2), include what is known as "attributes" of various types such as "extended" attributes and "file" attributes to be hereinafter described in great detail. One problem with the widely accepted OSF DCE DFS file system is that it does not provide for native support for attributes such as the OS/2 style attributes. Nevertheless, this functionality must be provided for OS/2 clients prior to the availability of such support for these attributes through DFS protocols.

The OS/2 client expects to attach standard file attributes (FAs) directly to a file. Moreover, OS/2 clients further expect to be able to retain additional information about files and directories in named entities known in the art as "extended" attributed (EAs). However, the OSF DCE DFS knows nothing about OS/2-specific FAs or EAs, and accordingly a need arose to accommodate such capability. However, an additional constraint on the system design was that such attributes must not be visible to the OS/2 DFS clients except through the normal OS/2 application programming interfaces. In other words, they must not be visible in the namespace which OS/2 DFS clients may access.

OS/2 extended attributes were implemented in the file allocation table (FAT) file system by storing all the EA data for a single OS/2 drive in a single file in the root directory of the drive. However, in addition to performance and accessing problems associated with a single file containing all EA data, the FAT solution was unworkable in DCE DFS environments because of security requirements. The DFS solution requires users to have the proper permission before accessing EA/FA data. This is true even if the user is on a non-OS/2 DFS system which does not support EAs. Grouping EA data from multiple users into a single file, as might otherwise be required without the invention, would render the provision for users to have proper permission unfeasible on a non-OS/2 system. Moreover, the single file concept, as previously noted, would give rise in many instances to the performance bottleneck noted when it is considered that hundreds and perhaps thousands of distributed file system users might need access to that single file at the same time.

SUMMARY OF THE INVENTION

It was an object of the invention to provide a system and method for supporting an operating system's file system attributes on a distributed file system having no native support for such attributes.

It is yet another object of the invention to provide a system and method for such support with improved performance and security characteristics.

Yet a further object of the invention was to provide for such support in a DFS environment wherein such attributes, including extended and file attributes, were visible to DFS clients only through APIs of the operating system, e.g. such attributes not being visible in the namespace which the operating system's DFS clients may access.

Support is provided for extended attributes and file attributes of an operating system for a DCE DFS file system not having native support through DFS protocols for such attributes.

In a preferred implementation, for a file "X" in directory "Y" in the DFS namespace for which EAs must be created, a subdirectory in directory "Y" is created and a further subdirectory under this subdirectory whose name is that of the filename "X".

Each EA will be placed in a file under the subdirectory "X", where the attribute name is the filename. Critical EAs ill be represented by the filename which is the atribute name for the particular file preceded by a critical designator such as "?".

Attribute names exceeding a maximum length in a preferred embodiment will have the first two characters of the attribute name replaced with a designator such as "??". The original name of the attribute will be stored in the file header whereby whenever a filename is encountered with such length designator "??" at the beginning, it indicates the need to examine the file header for the original name. Collisions regarding such extra length attribute names are resolved by addition of another designator such as "?" to the filename. Thus a second EA exceeding a maximum length would be distinguished from a first EA exceeding such maximum length with a similar name by means of a preceding "???" followed by a balance of the filename fitting within the predetermined character length constraint such as 256.

Also in a preferred embodiment, efficient access is provided to the total EA size and number of critical EAs for a file. In a preferred embodiment, in order to implement such efficient access, an additional file is created and stored under the aforementioned directory under directory Y. In the embodiment, such file will be named *N*C, where "N" is the total size bytes of all EAs and "C" is the number of critical EAs for the respective particular file.

In utilization of the aforementioned scheme for retrieving EA data in a DFS not providing native support for such attributes, a computer-implemented process will first determine, in response to a request for attributes of a filename, whether the previously described directory exists. If not, this indicates no EAs are attached to files in the file system, and a zero is returned for a query for size or critical status. If, on the other hand, in response to the request, a directory is present, the subdirectories thereof are searched for a subdirectory having the same name as the filename for which attributes were requested.

In response to such a search, if no such subdirectory is revealed, this indicates EAs are attached to some files in the file system but not to file "X" and accordingly a zero is returned. On the other hand, if a subdirectory is detected having the same name as the filename, files in the subdirectory are read. If the actual size of EAs and/or critical status thereof are queried for, the *N*C parameter is returned wherein n represents the size in bytes of all EAs for the file and "C" represents the number of critical EAs for the file. If, on the other hand, size or critical status is not queried, the process simply reads the EA file and passes back to the caller the appropriate data regarding the particular EAs requested such as icon, bit map, etc.

With respect to 0S/2 file attributes (FAs) having similar semantics to exit, ting DCE DFS file attributes, existing DCE DFS fields and interfaces will be employed to access and represent the respective attributes. In an implementation, for illustrative purposes, involving the OS/2 operating system, file attributes "Hidden", "System", and "Archive" apply only to OS/2 DFS users and will be represented using the following schema. For a file "X" in directory "Y" in the DFS namespace for which OS/2 FAs must be created a subdirectory in directory "Y" will be created. File attributes will be represented by a file under the subdirectory named "filename*v", where "filename" is the target file's name without a path and "v" is a value representing the file's OS/2 attribute settings.

When initially created such FAs, if the FA values requested by the caller match the defaults of a lookup table, then no FA directories or files will be created. When searching for a file s FAs and no FA directory or FA file is found, the default FA values will be assumed.

Whereas the embodiment just described is with respect to the DFS file system, the invention is not intended to be so limited and is thus applicable to distributed file systems generally having no name restrictions other than those of the POSIX IEEE 1003 standard and thus includes the aforementioned NFS file system.

Moreover, for convenience, when the acronym DFS has been used herein, the DCE DFS file system has been intended, whereas when the "distributed file system" term is herein utilized, the more general file systems thus described are intended.

BRIEF DESCRIPTION OF THE DRAWINGS

The foregoing and other objects, aspects, and advantages of the invention will be better understood from the following detailed description of the preferred embodiment of the invention with reference to the accompanying drawings, in which.

DETAILED DESCRIPTION OF THE PREFERRED EMBODIMENT

It will be noted that it is a feature of the invention to provide for file attributes for a particular operating system in a distributed file system environment which does not have native support for such attributes. Accordingly, in order to more fully understand the invention, an understanding of attributes of files in an operating system is required. In the preferred embodiment, such attributes will be discussed with respect to the OS/2 operating system. However, the invention is not intended to be so limited to a particular operating system, but rather may be readily generalized to handle and provide support for a given operating system's file attributes on a distributed file system not having native support therefore. Thus, the invention is not intended to be limited to the OS/2 embodiment herein illustrated.

For background and detail on the nature of attributes and, more particularly, extended attributes (EAs) and file attributes (FAs) as they relate to the OS/2 operating system, reference may be made to chapters 4 and 5 of the OS/2 2.0 Programming Guide, Vol. 1.

For present purposes, however, it will be appreciated that certain file systems such as the aforementioned OS/2 file system, maintain a standard set of information on file objects which typically includes the name and size of the file, date and time the file object was created, last accessed and last written to.

Applications may, however, attach additional information to a file object in the form of an extended attribute. There may be multiple EAs associated with one particular file object and, because of their flexibility, almost any information about the file may be stored in one. These EAs may be utilized to describe a file object to another application, to the operating system, and to the file system that is managing that object. The information contained therein may be utilized to store notes on file objects, (e.g. the name of the creator), to categorize file objects (for example, source, samples, icons, bit maps), to describe the format of data contained in the file object (for example a data record), or to append additional data to the file object.

An application uses extended attributes to provide a description of a file or directory. However the application may not actually place the description in the file or directory itself. Extended attributes associated with a file object are not necessarily part of the file object or its data. Rather, they may be stored separately from the file they are linked to and thereby referred to as being "attached", and the file system manages the storage and maintenance of such EAs.

Figure 9:
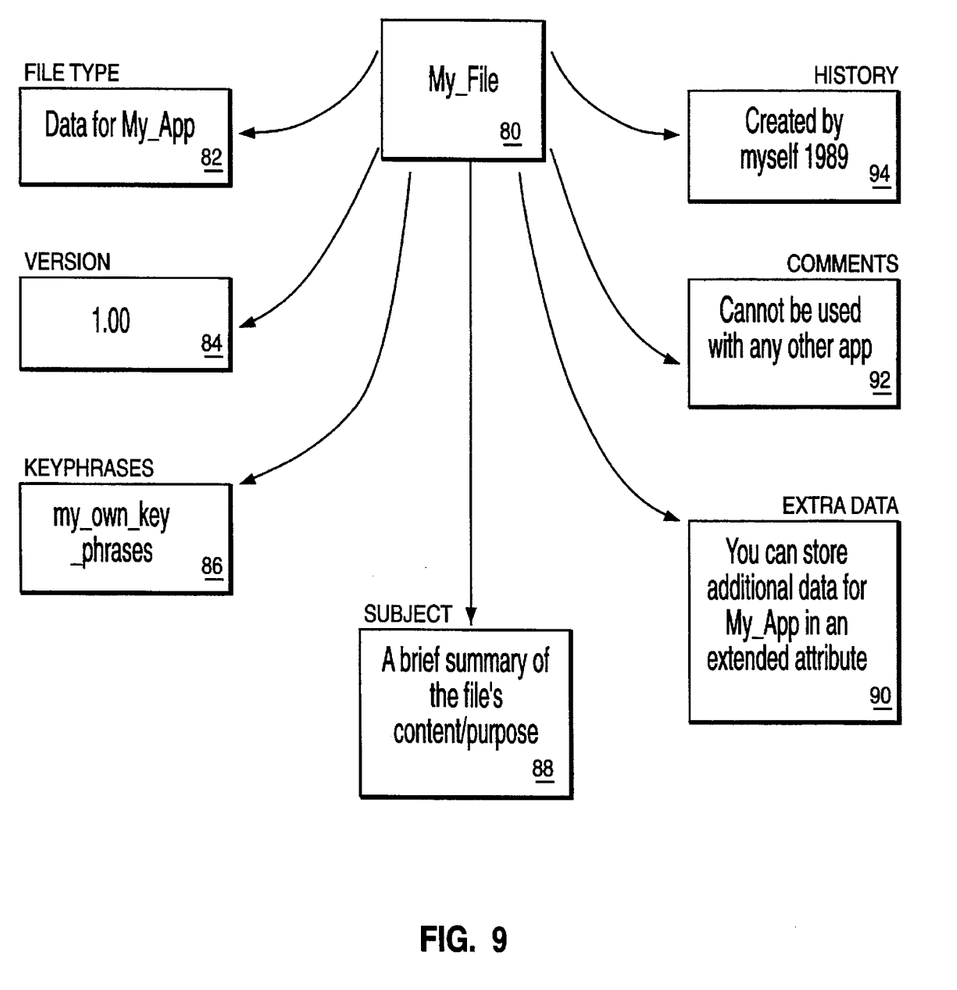
FIG. 9 is a block diagram illustrating extended attributes of a file.

The value of an EA may be text, a bit map, binary data, or the like. The operating system does not check data associated with an EA. The application which creates the EAs and the application that reads them must recognize the format and meaning of the data associated with a given EA name. Applications may examine, add, and replace EAs at any time. A file may have any number of EAs, as illustrated in FIG. 9. In the OS/2 implementation of EAs, each EA may be up to 64 KB in size, and the sum of all EAs for a file must not exceed 64 KB.

As an illustration of EAs, with further reference to FIG. 9, an illustrative file entitled "my__file", 80, is shown having numerous EAs 82–94 with the associated names and values shown in Table 1.

TABLE 1

| NAME | VALUE |
|---|---|
| FILE TYPE | Data for My__App |
| HISTORY | Created by myself 1989 |
| VERSION | 1.00 |
| COMMENTS | Cannot be used with any other app |
| KEYPHRASES | my__own__key__phrases |
| SUBJECT | A brief summary of the file's contents or purpose |
| EXTRA DATA | I can store additional data for My__App in an extended attribute |

So that EA data may be understood by their applications, conventions have been established for naming EAs and indicating the type of data they contain. Such EAs associated with a file object may not be part of the file object or its data but rather are "attached" as will be hereinafter described.

Referring to Table 2 which follows, it will be apparent that in the OS/2 implementation EAs may contain any type of data as shown by the variety of data types 96 and associated descriptions 98. All user-defined data types are length-preceded, meaning that a word indicating the length of the data in bytes precedes the data. As an example, a representation of the ASCII string "Hello" would be as follows: EAT$_{ASCII}$ 0005 Hello.

TABLE 2

Extended Attribute Data Types

| Data Type (96) | Value | Description (98) |
| --- | --- | --- |
| EAT_BINARY | FFFE | Binary (non-text) data; the first WORD following the data type specifies the length of the data |
| EAT_ASCII | FFFD | ASCII text; the first WORD following the data type specifies the length of the data |
| EAT_BITMAP | FFFB | Bit map data; the first WORD following the data type specifies the length of the data |
| EAT_METAFILE | FFFA | Metafile data; the first WORD following the data type specifies the length of the data |
| EAT_ICON | FFF9 | Icon data; the first WORD following the data type specifies the length of the data |
| EAT_EA | FFEE | ASCII name of another EA that is associated with the file. The contents of that EA are to be included into the current EA. The first WORD following the data type specifies the length of the data. |
| EAT_MVMT | FFDF | Multi-Valued, Multi-Typed data- two or more consecutive extended attribute values. Each value has an explicitly specified type. |
| EAT_MVST | FFDE | Multi-Valued, Single-Typed data- two or more consecutive attribute values. All values have the same type. |
| EAT_ASN1 | FFDD | ASN.1 field data; an ISO standard for describing multivalue data streams |

Because many applications utilize text, bit maps, and other binary data in EAs, standard names have been adopted to identify such formats for a common set of standard EAs although applications are not limited to such EAs and may define their own application-specific EAs. Such standard EAs in the OS/2 convention have a dot as a prefix identifying the EA as a standard EA. The leading dot is reserved, so that applications should not define EAs commencing width a dot. Also, EAs commencing with the characters $, @, &, or + are reserved for system use. Standard EAs which have been defined include .ICON, .TYPE, .KEYPHRASES, and the like more fully described in the previously noted IBM programmer's manual.

Now that a description of DCE, DFS, and the EA and FA aspects of OS/2 have been described, a specific DCE DFS client/server system will be described in greater detail with reference to FIG. 10 in which the invention may be implemented in a preferred embodiment. It will be noted from FIG. 10 that the DFS client 96 is implemented executing the OS/2 operating system and the DFS server 98 is implemented employing the AIX (TM) Unix-based operating system of the IBM Corporation. It will also be noted that the client 96 employs the OS/2 installable file system facility well known in the art, thereby removing the need for intercepting file system calls at the user level or kernel level above and below line 100, respectively. The cache manager 102, which handles the manipulation of remote files on the local workstation disk, is implemented at the user level above line 100. A driver on the client machine 96 is attached to a DFS file system driver 104 in the kernel below line 100. An IFS file system request router 106 directs file system requests to the DFS FSD 104 if the requests are associated with the drive to which the DFS FSD is attached. The FSD 104 then routes the file system requests to the DFS cache manager. The OS/2 cache manager (CM) 102 has a file system request administrator (VENUS) in the user space to receive requests from FSD 104. VENUS, 102, in turn includes a pool of threads to process such file system requests. A thread will be allocated to a file system request received from the FSD 104. Such VENUS thread will invoke appropriate mapping routines in CM 102 to translate the FSD 104 requests into CM vnode operations acted upon by the OSF CM 104A through the network by means of the previously discussed client and server remote procedure calls (RPC) 106, 108, respectively.

Figure 10:
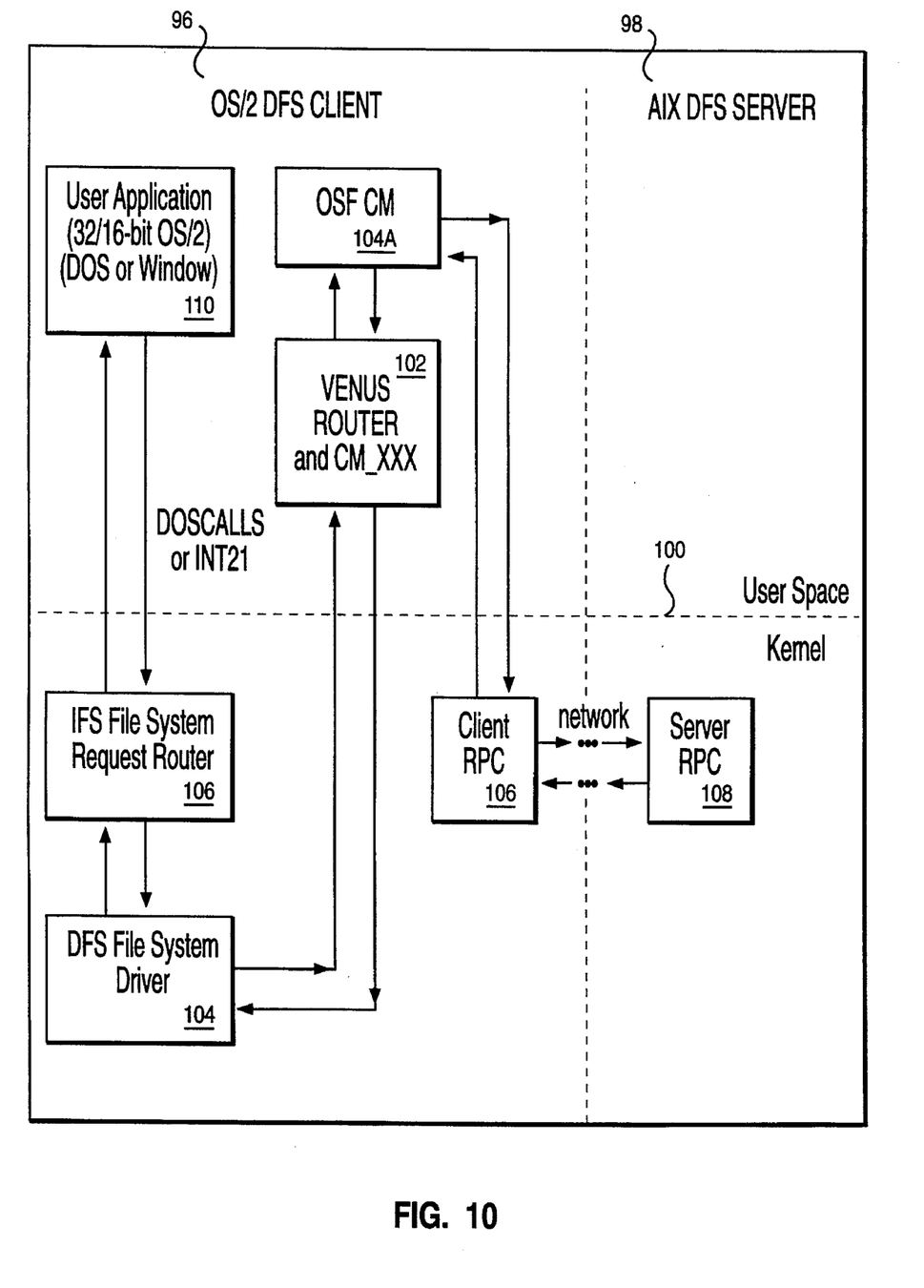
FIG. 10 is a block diagram illustrating an OS/2 DCE DFS client structure.

Finally, with respect to FIG. 10, it will be seen that in the client implementation, conventional DOS or windows calls will be issued or received by user applications 110 executing in the client 96 space, such calls being passed between the user application 110 and the IFS file system request router 106.

Clients, such as these of OS/2 and AIX, typically expect files and/or directories to contain attributes previously described such as "Archive", "Hidden", "System", "Icon", etc. It will be recalled from the foregoing that these attributes indicate characteristics of the file or directory which may be required by an application. In such operating systems as OS/2 and AIX, their file systems are constructed so that the attributes are "attached" directly to the data as contrasted with the case of DFS herein described wherein there is no provision for such ancillary extended attribute data. Thus, the problem arises that if EAs and FAs may not be attached to a file directly (e.g. the norm in a file system) then how may such attributes associated with an operating system be attached and referenced in the context of another file system such as DFS having no native support for theses attributes. In other words, in essence, FAs in OS/2 for example, are attached in part of the corresponding file, whereby when the file is moved, the FAs accompany it. This is not true in DCE for example, so that when a file is copied from a DCE server, heretofore the FAs or other attributes which may be crucial to the application would not accompany the file. Thus, a technique was needed for attaching these attributes in a DCE context.

Numerous other related problems have persisted. For example, when a "dir" is performed in OS/2 the user will see files in the directory but typically not related attribute files as a result of normal OS/2 APIs. In any implementation solving the problem of attaching attributes in DFS, it is highly desirable to retain this user convention of not displaying attributes unless explicitly commanded to do so, e.g. it was desirable that such attributes not be visible in the namespace which OS/2 DFS clients could access so that the OS/2 DCE user would see only what would be normally expected on a native OS/2 operating system and not the ancillary files which a typical OS/2 user would know nothing about.

Thus, in summary, as a practical example of a typical problem created by current systems, when files copied from a native OS/2 file system (which supports EAs and FAs) are copied to a popular distributed file system such as NFS, which does not support such EAs and FAs, they get deleted. However, applications for example may require such attributes which will accordingly break if attempted to be run without their respective attributes.

One attempt to solve the problem was to attach attributes by internal file handles. When a file system is on line and active in DFS, such file handles on a server are meaningful and valid. However, it soon became apparent that their utility in attaching attributes was lost once the system was backed up which is typically done. Internal identifiers or file handles may be efficient, but once the DFS file system is backed up and taken off line, when brought backon line, such files and associated file handles get reassigned as the files are brought back in.

In other words, a file "X" might have a handle name "27" when the DFS file system is backed up and brought back on line, it would however be assigned the next available internal number, (e.g. although we named it 27, after the server was backed up and brought on line the file might thereafter bedesignated "38", whereupon the server will no longer know, for example, about the previously identified file attribute).

Figure 11:
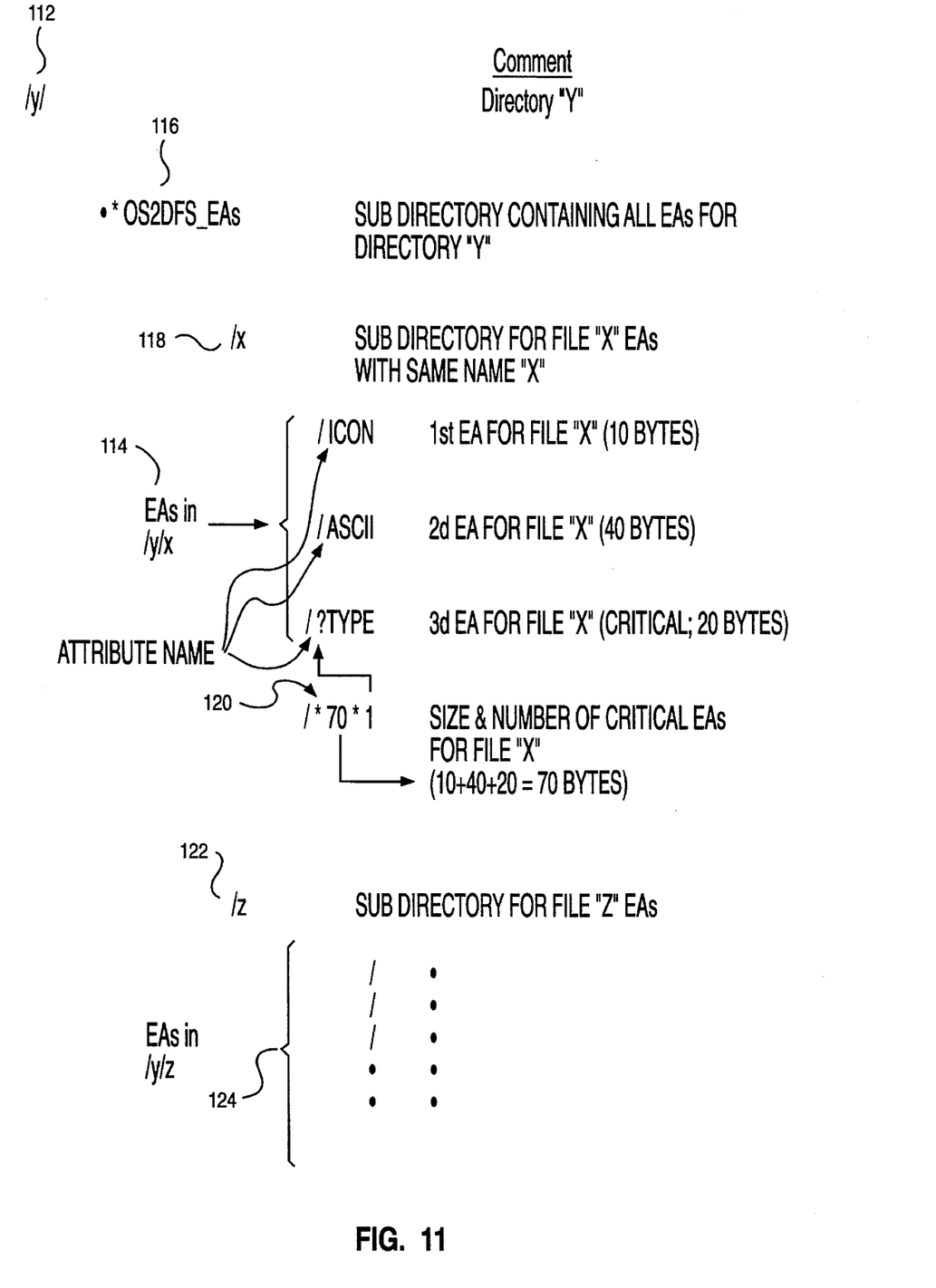
FIG. 11 is an example illustrating how EAs would be stored in accordance with the invention.

Turning now to FIG. 11, a technique in accordance with the invention for storing attributes is illustrated by means of a representative example. It will be assumed a file "X" in directory "Y" 112 exists with a number of EAs 114, such as "icon", "ascii" and "type". For this file "X" in directory "Y" 112 in the DFS namespace for which EAs must be created, a subdirectory 116 is created in directory "Y" 112 such as .*OS2DFS_EAs.

Next, a directory under the .*OS2DFS_EAs subdirectory 116 is created shown at reference numeral 118 whose name is the file's name (X). Each of the EAs 114 associated with the file X will be placed under the "X" subdirectory 118, with each of the attribute names such as "Icon" being the filename under the/X subdirectory.

A departure in the description relative to FIG. 11 must now be made with respect to "critical" EAs. A field in an EA may be user-specified as being "critical". As to the significance of "critical" designations, applications for example may have to access an attribute and its associated file in order to perform some task where the application may fail. Thus, we must be able to identify quickly and inform the calling function whether the attribute is critical.

As an example, in the REXX language, command files in some cases are compiled to operate efficiently. Compiled versions are extended attributes attached to the command version. Instead of carrying two versions of a command file, a compiled binary is "attached" as an EA. If it is specified that all REXX command files are desired to run an application, which would thus include the compiled version of commands, such commands would be "critical" to the application, e.g. if not attached, the application calling for them could not execute.

With the foregoing n mind, returning now to FIG. 11, if an EA is determined to be critical, it will be so marked by preceding its filename with a "?". For example, a conventional non-critical EA with an attribute name of "ICON" may be seen in FIG. 11 stored as a filename "ICON". However, an EA which might be deemed critical, such as "TYPE", would be indicated as "?TYPE" as also shown in FIG. 11. It will be noted that OS/2 extended attribute names must follow the same conventions as OS/2 filenames, and therefore "?" and "*" are not valid for use in names on OS/2.

EA file naming in accordance with the invention becomes more complicated when EA names reach a maximum length. One assumption of the present invention is that the maximum length attribute name case (with collisions) is seldom if ever going to happen. If the attribute name is the maximum length (for example, 256 characters), then the first two characters of the attribute name will be replaced with a "??". The original name of the attribute will be stored in the file header. Thus, whenever a filename is encountered with a "??" at the beginning, this is a signal to the DFS to look in the file header for the original name of the attribute. Because the original unique attribute name has been changed of course, a possibility arises of filename collisions. For example, two critical EAs with attribute names "A-maxlength . . . " and "B-maxlength . . . " would both have filenames of "??-maxlength . . . ". Such potential collisions will therefore be resolve by adding another "?" to the filename. Thus, in the foregoing example, the second EA would have a filename of "???-maxlength . . . ".

Continuing with the example of FIG. 11, operating systems such as OS/2 may provide for many EAs per file. When performing a "dir" #unction in OS/2, the corresponding call goes through the API and queries the file system for each file to determine the file size and size of the EAs. In the implementation of the invention herein described, it was undesirable to read all file headers for EA critical status, and size, and accordingly this information was pulled out for all EAs and cumulated or placed in a single file, thereby providing a performance benefit. Thus, in summary on this point, in order to provide efficient access to the total EAs size and number of critical EAs for a file, an additional file 120 is created for each file such as file X and placed under the .*OS2DFS_EAS/Xdirectory. This file will have a form and be named *N*C, wherein N is the size in bytes of all the EAs and C is the number of critical EAs for the file. Once again, the "*" at the beginning of the name is used to prevent conflict with EA names.

Using the example of FIG. 11, it will be noted that the file 120 includes a number "70" followed by a number "1". The 70 will be seen to be the sum of the sizes of the attributes ICON, ASCII, and ?TYPE, e.g. 10+40+20. The "1" indicates that the number of critical for file "X" is 1, e.g. the ?TYPE critical EA.

In like manner, a subdirectory/Z might be included under the directory 116 for all file "Z" EAs shown at reference numeral 122, with the EAs therefor shown at 124.

It will be appreciated that EAs in accordance with the invention, may be attached to directories as well as files. In the example given in FIG. 11, the illustration would be essentially the same if "X" was a directory rather than a file. Furthermore, attaching EAs to the root directory is the only exception to the scheme described in FIG. 11. The directory .*OS2DFS_EAs will be created in the root itself since there is not a parent directory.

It will be noted that the directory name such as *OS2DFS_EAs is inpermissibile in OS/2 applications. The OS/2 kernel will not permit this across the file system API, but will try to substitute something for the asterisk and will be unable to find any matches but the asterisk itself. This is to be contrasted with, and thus very unlike, the Unix model, where the file system will accept any value for a name, and the various shells are responsible for metachracter substitutions. In effect, what is being accomplished is the hiding of EAs and FAs in an opaque part of the DFS namespace, at least as far as OS/2 applications a users are concerned. This directory wherein the EAs reside is thereby only "semi-visible" to Unix users. The ameliorating circumstance is that it appears like an application configuration file that even novice Unix uers tend to not access or alter. The directory will not be visible because it starts with a ".", unless the Unix user specifically requests that it be seen. Even then, however, DCE DFS provides security support requiring a uses to have the proper permission before being allowed to access to a file or directory. This security support has been extended for EA/FA data and files. It requires the same permission to access EA/FA data as is required to access the file to which the EA/FA data is associated. Even if the Unix user has requested viewing of the directory, no user data is visible unless the user would also be able to access the data as an OS/2 user.

Figure 12:
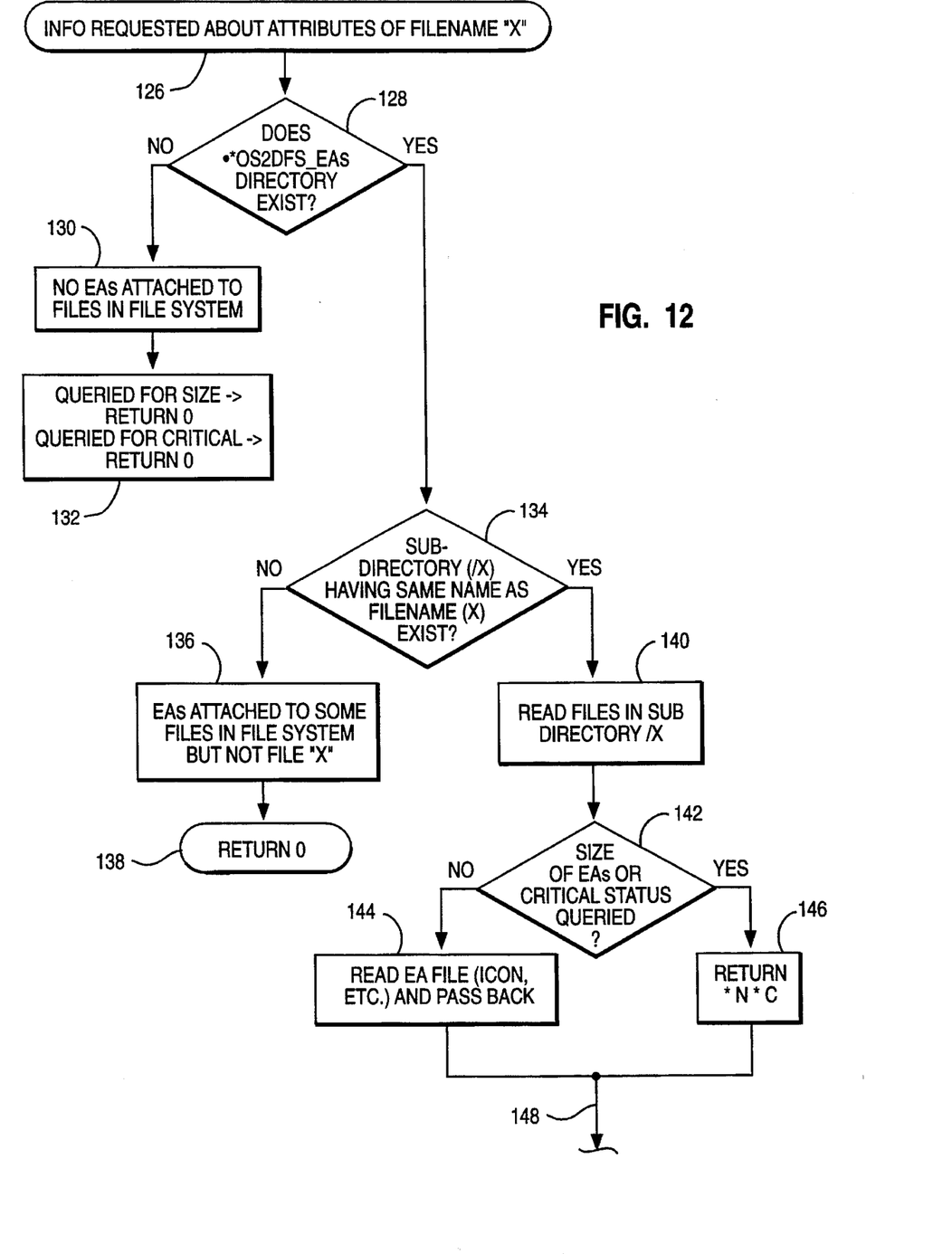
FIG. 12 is a flow diagram illustrating the use of EAs in accordance with the invention to support file attributes on a distributed file system.

Turning now to FIG.7 12, depicted therein is a flow diagram of how a system such as that of FIG. 10 might employ the EA filing technique beneficially which was just described with reference to FIG. 11.

First it will be assumed that an application has made a call for a "dir" function which may include a need to know how big the file is, and information regarding the EAs and FAs attached thereto. The OS/2 operating system would examine the call, and detect that it related to a file in the file system managed by DFS by means of the DFS file system driver, whereupon it is necessary to process the request. This information request about attributes is shown at block 126.

The system would then query at 128 whether the previously described *OS2DFS_EAs directory exists. If not, the left branch is executed, indicating at block 130 that no EAs are attached to files in the file system. Consequently, a query for size and/or query for whether critical EAs exist corresponding to the filename "X" will return 0, shown at 132. If, on the other hand, the directory in response to,decision block 128 is determined to exist, flow exits to the right to a next decision block 134. At block 134, a query is made as to whether a subdirectory/X having the same name as the filename (X) exists. If not, the flow exits the left path from block 134 indicating as shown at block 136 that EAs are attached to some files in the file system but not file "X", whereupon a 0 is returned, 138.

If on the other hand, in response to the decision block 134 it is determined that such a subdirectory/X exists, flow exits to the right of block 134, whereupon files in the subdirectory/X are read, 140.

Next, a determination is made at decision block 142 of whether the size of the EAs or critical status has been queried. If not, the EA files (ICON, etc.) are simply read and passed back to the caller, 144. If, on the other hand, the size and/or critical status of EAs has been requested, flow exits to the right of block 142 whereupon the parameter *N*C is returned at block 146. It will be recalled that the "N" in the parameter provides the desired EA Size and the "C" provides the count of critical EAs associated with the/X subdirectory. Control is thereafter returned at block 148.

Now that a description of storing and utilizing stored EAs in accordance with the invention has been made, attention will focus to the related problem of supporting file attributes, FAs. It will be recalled that OSF DCE DFS also does not have native support for OS/2 file attributes, yet this functionality must, in like manner to EAs, be provided for OS/2 clients prior to any future availability of support through DFS protocols. This function will be provided as follows with reference to Tables 3 and 4.

For OS/2 FAs having similar semantics to existing DCE DFS file attributes, existing DCE DFS fields and interfaces will be utilized to access and represent the particular attribute. The OS/2 FAs "Hidden", "System", and "Archive" apply only to OS/2 DFS users and will be represented using the schema hereinafter described.

For a file "X" in directory "Y" in the DFS namespace for which OS/2 FAs must be created, a directory "*OS2DFS_ FAs" will be created in directory "Y". Similarity to directory 116 in FIG. 11 with respect to EAs will be noted. Also similar to the approach of FIG. 11, the FA's attributes will be represented by a file under .*OS2DFS_FAs. The file will be named "FILENAME*V" where "FILENAME" is the target file s name without a path, and "V" is a value representing the file's OS/2 attribute settings. It will be noted that because of size restrictions, the values for V are not directly mapped to the OS/2 attribute values. In other words, an internal table is provided indicating what the value means. For example a "6" could correspond to a "Hidden" value of 4 and "System" value of 2.

When initially creating FAs, if the FA values requested by the caller match the defaults shown in Table 3, then no FA directories or file will be created. When searching for a file's FAs and no FA directories or file is found, then the default FA values will be assumed, shown in the right column of Table 3.

Shown in Table 4 is a representative example indicating how such FAs will be stored. It will be assumed that a file "X" in directory "Y" exists with FAs of "Hidden" and "System". The first line of Table 4 indicates the representation of file "X" in directory "Y". The second line of Table 4 indicates the subdirectory which contains all FAs for directory "Y". Finally, the third line of Table 4 indicates a file "X*6". From the foregoing, it would be apparent that this indicates that the FAs "Hidden" and "System" exist, as designated by the 6, for file "X".

TABLE 3

| File Type | Default value of attributes |
| --- | --- |
| File | Archive 0×20 |
| Directory | Subdirectory 0×10 |

TABLE 4

| | |
| --- | --- |
| /y/x | File x in directory y |
| /y/.*OS2DFS_FAs | Contains all FAs for directory y |
| /y/.*OS2DFS_FAs/x*6 | FAs Hidden and System for file x |

FAs may also be attached to directories. The example with reference to Table 4 would be the same essentially if "X" was a directory. Also, attaching FAs to the root directory is the only exception to the scheme described above as is the case with EAs. The directory *OS2DFS_FAs will be created in the root itself since there is no parent directory.

From the foregoing, it will be readily apparent the invention is not limited to an OS/2 client-DCE DFS implementation. Rather, it may be generalized to the notion of storing attributes of files associated with one operating system's file system on another file system having no native support for the attributes on the first system.

Yet another point worth noting is that even with provision for native support eventually for example on DCE DFS for OS/2 file attributes, the invention nevertheless provides significant value. For example, even with such native support being available, there is no guarantee that vendors will adopt such native support. Accordingly, the invention retains value not only for older systems not having native support, but also for newer systems wherein the customers for whatever reason do not elect to adopt it.

Finally, the components of a representative computer system such as a PC or Workstation will be described which may be utilized by a user in storing and accessing attributes as part of a component of the system of FIG. 10.

Figure 1:
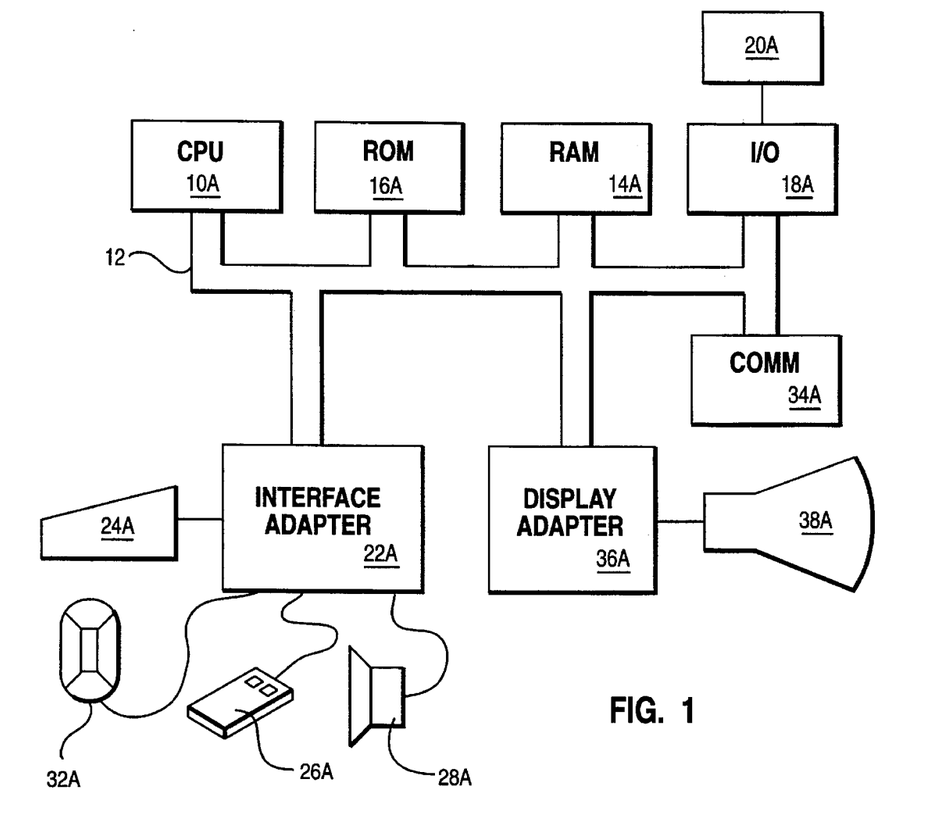
FIG. 1 is block diagram of a typical individual computer site such as a PC or workstation forming a component of a DCE DFS environment in accordance with the invention.

The clients and servers described herein may be preferably implemented with workstations such as an IBM® RISC System/6000® computer. A representative hardware environment is depicted in FIG. 1 which illustrates a typical hardware configuration of a workstation in accordance with the subject invention having a central processing unit (CPU) 10A such as a conventional microprocessor, and a number of other units interconnected by a system bus 12A. The workstation shown in FIG. 1 includes random access memory (RAM) 14A, read only memory (ROM) 16A, and I/O adapter 18A for connecting peripheral devices such as disk units 20A to the bus, a user interface adapter 22A for connecting a keyboard 24A, mouse or other pointing device 26A, speaker 28A, microphone 32A, and/or other user interface devices such as a touch screen device, etc. to the bus. The system further includes a communication adapter 3A for connecting the workstation to a data processing network, and a display adapter 36 for connecting the bus to a display device 38A. The workstation has resident thereon an operating system such as the IBM AIX® operating system.

While the invention has been shown and described with reference to particular embodiments thereof, it will be understood by those skilled in the art that the foregoing and other changes in form and detail may be made therein without departing from the spirit and scope of the invention.

We claim:

1. A computerized method for storing data related to attributes of an operating system namespace and file having a corresponding operating system filename, said operating system file being stored in a directory in a distributed file system namespace, wherein said attributes are unsupported in said namespace, comprising the steps of:

creating a first directory under said directory containing all of said attributes for said directory;

creating a second directory under said first directory having the same name as said operating system filename;

storing a plurality of said attributes under said second directory as attribute files, each said attribute file having a corresponding attribute filename and an original filename corresponding to a respective attribute to render said attribute file invisible to clients accessing said operating system namespace, and selected ones of said attribute filenames further each including a critical file designator preceding a respective said original attribute filename to indicate that said selected attribute filename corresponds to a critical said attribute file;

determining the total size "N" of said attribute files and the number "C" of said critical attribute files; and storing under said second directory a size/critical file including said total size "N" of said attribute files and said number "C" of said critical attribute files.

2. The method of claim 1 wherein each said attribute filename exceeding a predetermined maximum length includes a maximum length designator.

3. The method of claim 2 wherein each said critical file designator is a "?".

4. The method of claim 2 wherein said length designator replaces a first portion of a respective said original attribute filename corresponding to said attribute filename, when said attribute filename exceeds said predetermined length.

5. The method of claim 4 wherein said maximum length designator is a "??".

6. The method of claim 4, wherein when a first and second said attribute filename exceed a predetermined maximum length, said first attribute filename is distinguished from said second attribute filename with an additional said maximum length designator.

7. The method of claim 1 wherein said size/critical file is of the form *N*C.

8. The method of claim 1 wherein said distributed file system is in a distributed computing environment (DCE).

9. The method of claim 8 wherein said distributed file system is a DCE DFS, and said operating system is an OS/2 operating system.

10. A computerized system for storing data related to attributes of an operating system file having a corresponding operating system filename, said operating system file being stored in a directory in a distributed file system namespace, wherein said attributes are unsupported in said namespace, comprising:

means for creating a first directory under said directory containing;

means for creating a second directory under said first directory having the same name as said operating system filename;

means for storing a plurality of said attributes under said second directory as attribute files, each said attribute file having a corresponding attribute filename and an original filename corresponding to a respective attribute to render said attribute file invisible to clients accessing said operating system namespace, and selected ones of said attribute filenames further each including a critical file designator preceding that said selected attribute filename corresponds to a critical said attribute file;

means for determining the total size "N" of said attribute files and the number "C" of said critical attribute files; and means for storing under said second directory a size/critical file including said total size "N" of said attribute files and said number "C" of said critical attribute files.

11. The system of claim 10 wherein each said attribute filename exceeding a predetermined maximum length includes a maximum length designator.

12. The system of claim 11 wherein each said critical file designator is a "?".

13. The system of claim 11 including means for replacing a first portion of a respective said original attribute filename corresponding to said attribute filename when said attribute filename exceeds said predetermined length with said length designator.

14. The system of claim 13 wherein said maximum length designator is a "??".

15. The system of claim 13, including means for distinguishing said first attribute filename from said second attribute filename with an additional said maximum length designator when a first and second said attribute filename exceed a predetermined maximum length.

16. The system of claim 10 wherein said size/critical file is of the form *N*C.

17. The system of claim 10 wherein said distributed file system is in a distributed computing environment (DCE).

18. The system of claim 17 wherein said distributed file system is a DCE DFS, and said operating system is an OS/2 operating system.

* * * * *